United States Patent [19]

Gregorek et al.

[11] Patent Number: 5,428,670
[45] Date of Patent: * Jun. 27, 1995

[54] COMMUNICATIONS MARKETING SYSTEM

[75] Inventors: Mark R. Gregorek, Mahwah; Jeffrey C. Dillow, Sparta, both of N.J.

[73] Assignee: Quantum Systems, Inc., Ramsey, N.J.

[ * ] Notice: The portion of the term of this patent subsequent to Jun. 14, 2011 has been disclaimed.

[21] Appl. No.: 245,723

[22] Filed: May 18, 1994

Related U.S. Application Data

[63] Continuation-in-part of Ser. No. 718,080, Jun. 20, 1991, Pat. No. 5,321,740.

[51] Int. Cl.⁶ .................... H04M 3/22; H04M 3/42
[52] U.S. Cl. ......................... 379/67; 379/88; 379/257; 379/381
[58] Field of Search ............... 379/67, 87, 257, 374, 379/82, 84, 88, 201, 372, 96, 381

[56] References Cited

U.S. PATENT DOCUMENTS

| | | | |
|---|---|---|---|
| 1,958,896 | 5/1934 | Lesavoy et al. | 379/84 |
| 3,165,590 | 1/1965 | Brooks et al. | 379/252 |
| 3,482,057 | 12/1969 | Abbott et al. | 379/67 |
| 3,700,813 | 10/1972 | Colmon | 379/357 |
| 4,255,621 | 3/1981 | Marheine | 379/67 |
| 4,277,649 | 7/1981 | Sheinbein | 379/201 |
| 4,451,704 | 5/1984 | Winkelman | 379/67 |
| 4,510,349 | 4/1985 | Segre-Amar | 379/87 |
| 4,720,848 | 1/1988 | Akiyama | 379/88 |
| 4,809,321 | 2/1989 | Morganstein et al. | 379/211 |
| 4,811,382 | 3/1989 | Sleevi | 379/67 |
| 4,850,007 | 7/1989 | Marino et al. | 379/67 |
| 4,910,762 | 3/1990 | Blom | 379/67 |
| 4,932,042 | 6/1990 | Baral et al. | 379/67 |
| 5,333,186 | 7/1994 | Gupta | 379/201 |

FOREIGN PATENT DOCUMENTS

| | | | |
|---|---|---|---|
| 1198843 | 12/1985 | Canada | 379/88 |
| 3306313 | 8/1984 | Germany | 379/88 |
| 57-87661 | 6/1982 | Japan | 379/257 |
| 58-108855 | 6/1983 | Japan | 379/88 |
| 2170377 | 7/1986 | United Kingdom | 379/88 |

Primary Examiner—Thomas W. Brown
Attorney, Agent, or Firm—Panitch Schwarze Jacobs & Nadel

[57] ABSTRACT

A marketing system for selectively modifying an existing communications network by modifying a portion of the processing software permits replacing at least a portion of a call progress signal generated by the communications network by a generally continuous pre-recorded announcement. A first station is provided for placing a call by a calling party at a first network address. The network is adapted for connecting the call to an identified called station at a second network address, the called station having either a busy status or an idle status. The network initially determines the busy/idle status of the called station and, if the called station has an initial busy status, thereafter checks the busy/idle status of the called station at predetermined intervals. A player plays at least one generally continuous announcement to the calling party for a predetermined period of time during a time period when a call progress signal would have been provided to the calling party. The player determines the announcement to be played based upon criteria established exclusively by the marketing system and independently of the identity of the called station. The playing of the announcement is terminated and the call is completed to the calling station, in the case of the calling station having an initial idle status, when the called station responds by answering the call. In the case of the called station having an initial busy status, the playing of the announcement is terminated and the call is completed when the status of the called station changes to an idle status and the called station thereafter responds by answering the call.

11 Claims, 7 Drawing Sheets

COMMUNICATIONS MARKETING SYSTEM

CROSS REFERENCE TO RELATED APPLICATION

This is a continuation-in-part of U.S. patent application Ser. No. 07/718,080, filed Jun. 20, 1991, and entitled "Telephone Marketing System", now U.S. Pat. No. 5,321,740.

FIELD OF THE INVENTION

The present invention relates to a communications marketing system and, more particularly, to a communications marketing system for selectively modifying a communications network by replacing at least a portion of an audible or visual call progress signal generated by the communications network by a prerecorded announcement and by modifying a portion of the existing processing software of the communications network.

BACKGROUND OF THE INVENTION

Most conventional communications networks today, particularly existing telephone networks, provide a calling party with an audible ringback signal when an intended called network address or station line is idle and a busy signal when the intended called network address or station line is already in use, i.e., the telephone or other device at the called network address is being used. Many calling parties become frustrated when encountering a busy signal especially since the standard or usual tones used to signify a busy signal are annoying. The time that a calling party and/or the calling station equipment remains on the line and attempts to redial the called network address or station line normally represents wasted time and unnecessarily occupies network equipment without generating network income. The time spent while waiting for the call to be completed, i.e., during the audible ringback period or other call set-up periods, is also wasted time and money. It would be beneficial to be able to productively occupy the time that the calling party and/or the calling station equipment is on the line or occupying a portion of the network without annoying the calling party by requiring the calling party to listen to or view a meaningless or annoying busy signal or a ringback signal. The foregoing scenario holds true whether the calling party is attempting to complete a call to another telephone or to any other location within a communications network which has a network address assigned to it, regardless of the station equipment which may be connected at either end of the network connection or within the network itself.

It would be advantageous to have a communications system which would replace the audible or visual ringback and/or busy signals initiated by the communications network with a series of pre-recorded announcements which would provide the calling party with useful information. When the telephone or other device at the called network address or station line is answered, the announcements would discontinue and the connection would be completed in the usual manner. In addition, the announcements would be discontinued if the calling party abandons the communication or attempted communication.

The present invention is directed to a communications marketing system which is capable of replacing a busy signal or ringback signal by one or more pre-recorded announcements. The present communications marketing system notifies the calling party or caller that the line of the called network address or station is either busy or idle and, if busy, that the line will be automatically retried for completion of the call after expiration of a predetermined time period. If the line is idle, one or more pre-recorded announcements are played for the caller, the announcements continuing until a party or device at the called network address or station responds by answering the telephone or otherwise. At that time, the announcements are discontinued and the call is completed. If the called network address or station line is busy, a number of pre-recorded announcements are played for the predetermined time period. The announcements can vary in subject matter. Once the called network address or station line is determined to be idle, i.e., no longer in use, the calling party is automatically connected to the called network address or station line and the announcements are terminated.

SUMMARY OF THE INVENTION

Briefly stated, the present invention comprises a marketing system for selectively modifying an existing communications network by modifying a portion of the processing software of the existing communications network and by replacing at least a portion of a call progress signal generated by the communications network by a generally continuous pre-recorded announcement. Means are provided for placing a call by a calling party at a first network address. Means are provided for connecting the call to an identified called station at a second network address, the called station having either a busy status or an idle status. Means are provided for initially determining the busy/idle status of the called station and, if the called station has an initial busy status, for thereafter checking the busy/idle status of the called station at predetermined intervals. Means are provided for playing at least one generally continuous announcement to the calling party for a predetermined period of time during a time period when a call progress signal would have been provided to the calling party. The playing means determine the announcement to play based upon criteria established exclusively by the marketing system and independently of the identity of the called station. Means are provided for terminating the playing of the announcement and completing the call to the called station, in the case of the called station having an initial idle status, when the called station responds by answering the call and, in the case of the called station having an initial busy status, when the status of the called station changes to an idle status and the called station thereafter responds by answering the call.

BRIEF DESCRIPTION OF THE DRAWINGS

The foregoing summary, as well as the following detailed description of a preferred embodiment, will be better understood when read in conjunction with the appended drawings. For the purpose of illustrating the invention, there is shown in the drawings embodiments which are presently preferred, it being understood, however, that the invention is not limited to the specific methods and instrumentalities disclosed. In the drawings.

DETAILED DESCRIPTION OF PREFERRED EMBODIMENTS

Figure 1:
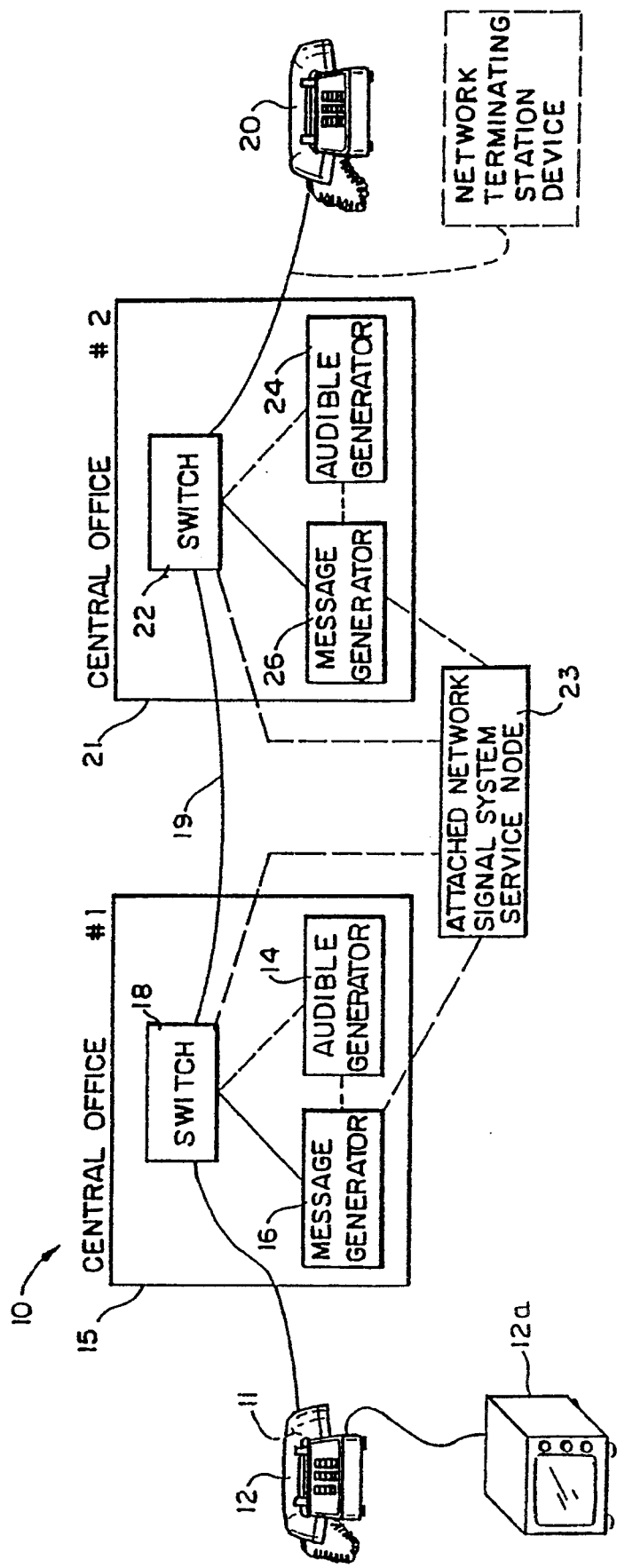
FIG. 1 is a block diagram of a presently preferred embodiment of a communications marketing system in accordance with the present invention.

Referring to the drawings, wherein like numerals indicate like elements throughout, there is shown in FIG. 1 a schematic block diagram of a communications marketing system 10 in accordance with the present invention. The present invention 10 is designed for use with any type of communications network including any network capable of transmitting voice, data, video, multi-media, real time, store and forward, interactive, or hybrid types of information. The communications network may be provided by private or publicly owned local, local exchange, interexchange, long distance, international, telecommunications, cable television, broadcast, switched, dedicated or hybrid types of network providers utilizing wireless, facilities-based, satellite-based, or hybrid types of transmission schemes and/or mechanisms. For the sake of brevity and simplicity, the embodiment of the invention illustrated in the figures is specifically directed to a standard or typical telephone system used for providing voice communication between two individual network addresses, in the present embodiment, telephone stations or telephones. However, it should be clearly understood by those skilled in the art that the present invention is not limited to such standard telephone station to telephone station communications systems. In addition, while in the described embodiment, one or both of the telephone stations are illustrated as being typical or standard telephone instruments, the term "station" could refer to any device or object which may be connected to or be an integral part of a communication network to allow for the initiation, receipt and interaction of audio and/or visual information, including voice, data, video, multimedia, real time, store and forward, interactive or hybrid types of information. It should also be clearly understood that the term "station" should be read to include but not be limited to devices such as telephones, televisions, video monitors, video telephones, computers, television set-top converters, modems, video servers, front end processors, other communications networks, and combinations or hybrids thereof.

Referring to FIG. 1, with the communications system 10, a calling party at a first location or station line places a call by means of any type of communication device, in the illustrated embodiment, a first telephone 12, such as but not limited to, a rotary dial or touch tone telephone instrument of a type well known in the art. For purposes of the present description, the term "call" shall not be limited to a voice communication but instead shall mean any communication between two network addresses. The first telephone 12 could also be connected to a video display terminal 12a for transmission of video signals such as a computer terminal, video telephone, telephone monitor, or the like. It should be understood by those skilled in the art that the communications marketing system 10 is not limited to use with a conventional telephone or with a conventional telephone system but, instead, can be used with any type of communications device or system.

As is well known in the art, when a calling party removes the handset 11 from the base of a telephone 12, a connection is formed with a first local central office 15 which is usually associated with a local telephone company. The first local central office 15 transmits a dial tone back to the first telephone 12 to indicate the availability of telephone service. The telephone number dialed or otherwise entered by the calling party using the telephone 12 is transmitted to the local central office as a series of signals which are detected by a computerized switch 18 located within the first local central office 15. The switch 18 is responsible for determining the destination (network address) of the call based upon the transmitted signal, i.e., the number dialed. The switch 18 transmits the call initiated by the calling party over the communications network 19 toward an identified network address or called station which in the present embodiment comprises a second telephone 20 but could comprise any other type of communication device. The called network address or station is identified by the telephone number entered by the calling party at the first telephone 12. In the present embodiment, the communication network 19 is a local exchange network. However, the communication network 19 could also be an inter-exchange network, long distance network, international network, telecommunications network, cable television network, broadcast network, switched network, dedicated network, or a hybrid type of the foregoing networks.

The call from the calling party is received by a second computerized switch 22 located at a second local central office 21 which determines the status of the second telephone 20, i.e., whether the second telephone is in a busy state or in an idle state. An attached network signaling system 23 can also determine the busy/idle status of the called network address or station line. The specific procedure by which the switch 22 or an attached network signaling system 23 determines the busy/idle status of the called network address or station line is well known to those skilled in the art and will not be discussed further.

The switch 18, in the present embodiment, is connected to an audible generator or audible signal generator 14 which is capable of generating a ringback signal if the called network address or station line is idle, i.e., the second telephone 20 is not in use, or a busy signal if the called network address or station line is busy, i.e., the second telephone 20 is in use. As will be discussed hereinafter, the switch 22 or an attached network signaling system (ANSS) 23 determines the status of the second telephone line and instructs the audible signal generator 14 or notifies the switch 18 to instruct the audible signal generator 14 to transmit the appropriate call process signal, i.e., either a ringback or a busy signal. The audible signal generator 14 is of a type well known in the art and, therefore, will not be discussed further. The second switch 22 is connected to a conventional second audible signal generator 24. Depending upon the configuration of the network, either audible signal generator 14 or 24 can transmit the call progress signal to the first telephone 12.

A message generator 16 is also connected to the switch 18 and is capable of supplementing and/or replacing the signals generated by the audible signal generator 14. The switch 18 or an attached network signaling system 23, determines whether the audible signal generator 14 or the message generator 16 is activated as discussed hereinafter. For purposes of discussion, the audible signal generator 14 and the message generator 16 will be assumed to be providing signals and/or announcements to the first telephone 12. As with the first audible signal generator 14, the second audible signal generator 24 is connected to a second switch 22 as is a second message generator 26 which is similar to the first message generator 16. Message generators 16 and 26 can alternatively be located at an attached signaling service node location, if desired.

Announcements are enabled by inserting a software subroutine into the call processing software of the network. It is well known to those in the art the various ways the software can be incorporated into the call processing system of the network and, therefore, such ways will not be discussed further. The software subroutine causes call processing procedures to be modified and allows the message generator 16 to become an integral part of the call completion sequence.

The switch 22 or ANSS 23 first determines the initial busy/idle status of the second telephone 20. If the second telephone 20 is initially busy, the switch 22 or ANSS 23 suspends further call processing for a predetermined period of time. Simultaneously, the switch 22 or ANSS 23 signals the message generator 16 to initiate an announcement sequence which is provided to the first telephone 12. After expiration of the predetermined period of time, the switch 22 or the ANSS 23 rechecks the busy/idle status of the second telephone 20 and again communicates the status to the message generator 16. The software sub-routine is designed to allow for regular and periodic checking of the busy/idle status of the second telephone as long as the calling party does not abandon the call and continues to provide the busy/idle status to the message generator 16.

If the second telephone is idle, the second switch 22 or the ANSS 23 can either activate the audible signal generator 14 to produce a conventional audible ringback signal or can activate the message generator 16 to play a series of prerecorded announcements to the calling party for a predetermined period of time. The message generator 16 is also capable of producing a conventional audible ringback signal in place of the audible signal generator 14. In either case, the resulting message or audible ringback signal indicates to the calling party that the second telephone 20 is not currently in use. If the second telephone 20 is busy, the second switch 22 or the ANSS 23 can either activate the audible signal generator 14 to generate a busy signal or activate the message generator 16 to play a series of pre-recorded announcements to the calling party for a predetermined period of time while periodically checking to determine if the second telephone 20 is still busy. The message generator 16 is also capable of producing conventional busy signals in place of the audible signal generator 14. The resulting message stream and/or busy signal indicates to the calling party at the first telephone 12 that the second telephone 20 is busy and, if a message is played, indicates that the system will automatically try to make the connection to the second telephone 20 after expiration of a predetermined period of time. A possible time frame for again trying to make the connection to the second telephone is every fifteen seconds. However, it is to be understood by those skilled in the art that any other suitable time frame, including a variable time frame, could be used in the alternative.

In the preferred embodiment, the marketing system 10 selects the type of announcements which are to be played to the calling party. The marketing system 10 can also determine when a particular announcement is to be played based upon a number of criteria or factors, such as but not limited to, the time of day, the day of the week, the month of the year, the network address of the calling party or the called station line, etc. When a call is initiated to the second telephone 20, the message generator 16 can use an automatic number identification (ANI) system or equivalent to identify the network address of the calling telephone 12. Such systems are well known to those skilled in the art and need not be described in greater detail.

If the message generator 16 is set to determine which announcements are to be played based upon the network address of the calling telephone 12, the message generator 16 can read the network address as provided by the network and can determine the geographical location of the telephone 12 by matching the network address with a location provided by a look-up table located in the memory (not shown) of the message generator 16. The message generator 16 determines which announcements are designated for the particular network address and plays the pre-recorded message in a predetermined segment of time until the telephone 20 is answered or until the call is abandoned.

The message generator 16 can also play certain messages based on the time of day, day of week, month of year or any other time frame reference. A clock (not shown) located within the message generator 16 monitors the time of day, day of week, day of month, month of year and year. When a call is placed to the second telephone 20 from the first telephone 12, and the message generator 16 has been signaled to initiate a message sequence, the information from the clock is read by the message generator 16 and is compared to information located in a look up table in the memory of the message generator 16 to determine which messages are to be played. The message generator 16 continually retrieves the designated messages in predetermined segments of time until the telephone 20 is answered or the call is abandoned. It should be appreciated that, if desired, live announcements may be provided under control of the message generator 16.

Figure 2:
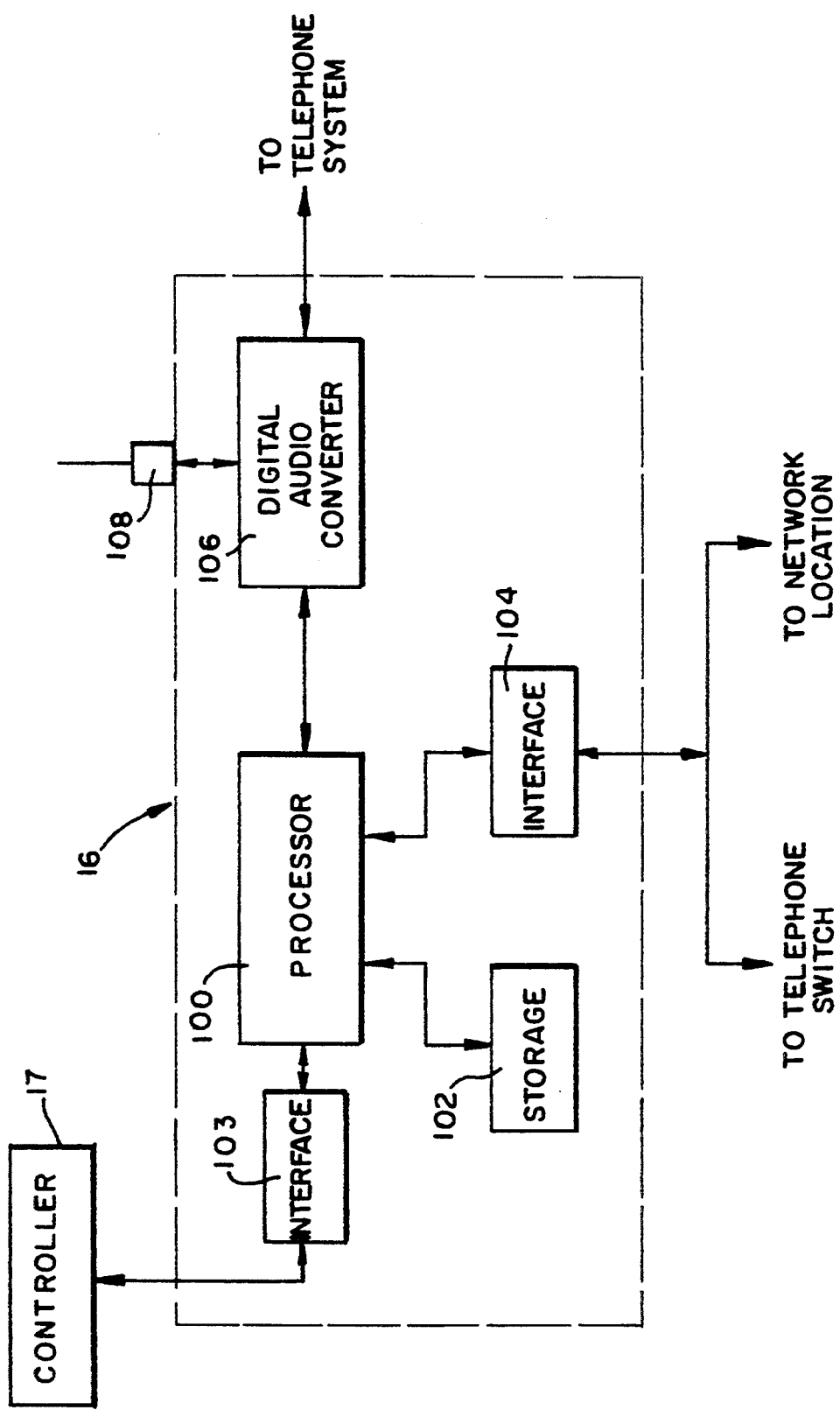
FIG. 2 is a schematic block diagram of a message generator located within the communications marketing system of FIG. 1.

Referring specifically to FIG. 2, there is shown a block diagram depicting the internal components of a preferred embodiment of a message generator 16. Each message generator 16 comprises a processor or microprocessor 100 for processing stored announcements and transmitting the announcements to a telephone 12 of a calling party through the network. It is to be understood by those skilled in the art that any other type of computer, processor or microprocessor can be used in conjunction with the message generator 16. A storage device 102 is connected to the microprocessor 100 and acts as a mass storage device for storing the pre-recorded announcements, associated data, as well as the software necessary for control of the message generator 16 and for associated processing. The storage device 102 is preferably either a magnetic hard disk or an optical storage device, such as, but not limited to, a CD ROM, CD-I, or optical disk.

Data relating to a specific pre-recorded announcement is transmitted from the storage device 102 to the memory (not shown) located within or associated with the microprocessor 100 to enable processing of the announcements. The pre-recorded announcements are stored within the storage device 102 until the announcements are retrieved by the microprocessor 100 to be transmitted to the telephone station 12 of the calling party. In the preferred embodiment, the message generator 16 also comprises a digital audio converter or card 106 and/or a video card (not shown) for containing digital pre-recorded advertisements which can be transmitted to the telephone station 12 of the calling party, or if the calling party has a communication system having video capabilities such as a video telephone, video monitor 12a, television, set-top converter or other such device, a video announcement can be transmitted from the video card.

A clock (not shown) is located within the microprocessor 100 and monitors the period of time necessary for each announcement to be played. The time is recorded and stored within the storage device 102. The clock is also capable of recording the period of time necessary for a sequence of messages to be played to a calling party during a particular call.

When an announcement or a series of announcements are to be played, the telephone switch 18 or the ANSS 23 is connected to the microprocessor 100 via a communication interface device 104, which allows for the transfer of information to and from the message generator 16 through the network. In the preferred embodiment, the communication interface is a digital data communications port (DDCP). Once the microprocessor 100 receives a signal from the switch 18 or the ANSS 23, an announcement is retrieved from the storage device 102. The digitally stored announcement is transmitted to the digital audio converter 106 which converts the digital signals into an audio announcement. The audio announcement, once processed, is transmitted to the first telephone 12. An interface jack 108 is connected to the digital audio converter 106 to permit audio announcements to be converted to digital format for storage within the storage device 102.

The microprocessor 100 is also connected to a main controller 17 via a communication interface 103, such as a modem, and acts as a main processing system for all message generators located within the communications network or system. The main controller 17 is capable of logging into its data files each announcement which is played to a particular first telephone station 12. In the preferred embodiment, the controller 17 records the announcement's file name, play time, geographical area in which the announcement has been played and the billing charge for the played announcement. It is to be understood by those skilled in the art, that the main controller 17 can store any information which is considered to be pertinent to the system's billing and processing requirements. The main controller acts as the central recordkeeping and billing location. The main controller can also remotely deliver and update all audio and/or video advertising and other announcements contained at each message generator 16. In the preferred embodiment, the message generator 16 is also capable of dialing to or being dialed by remote computing equipment (not shown) in order to transfer audio and video advertisements and/or messages or to delete or modify previously stored announcements.

Figure 3:
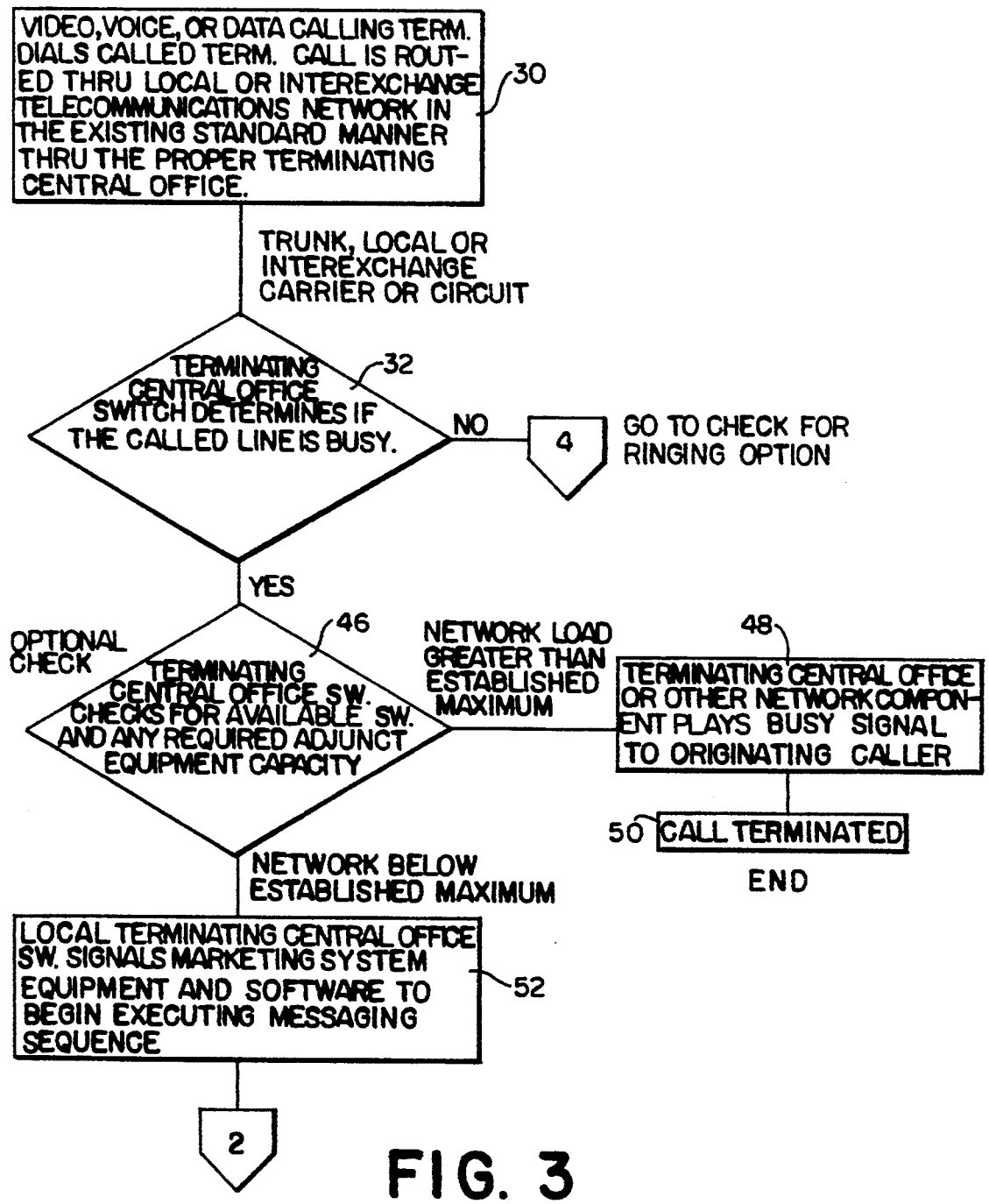
FIGS. 3-8 are flow diagrams of the call handling procedure of the communications marketing system of FIG. 1 and its interaction with the communications network call handling procedures.
Figure 4:
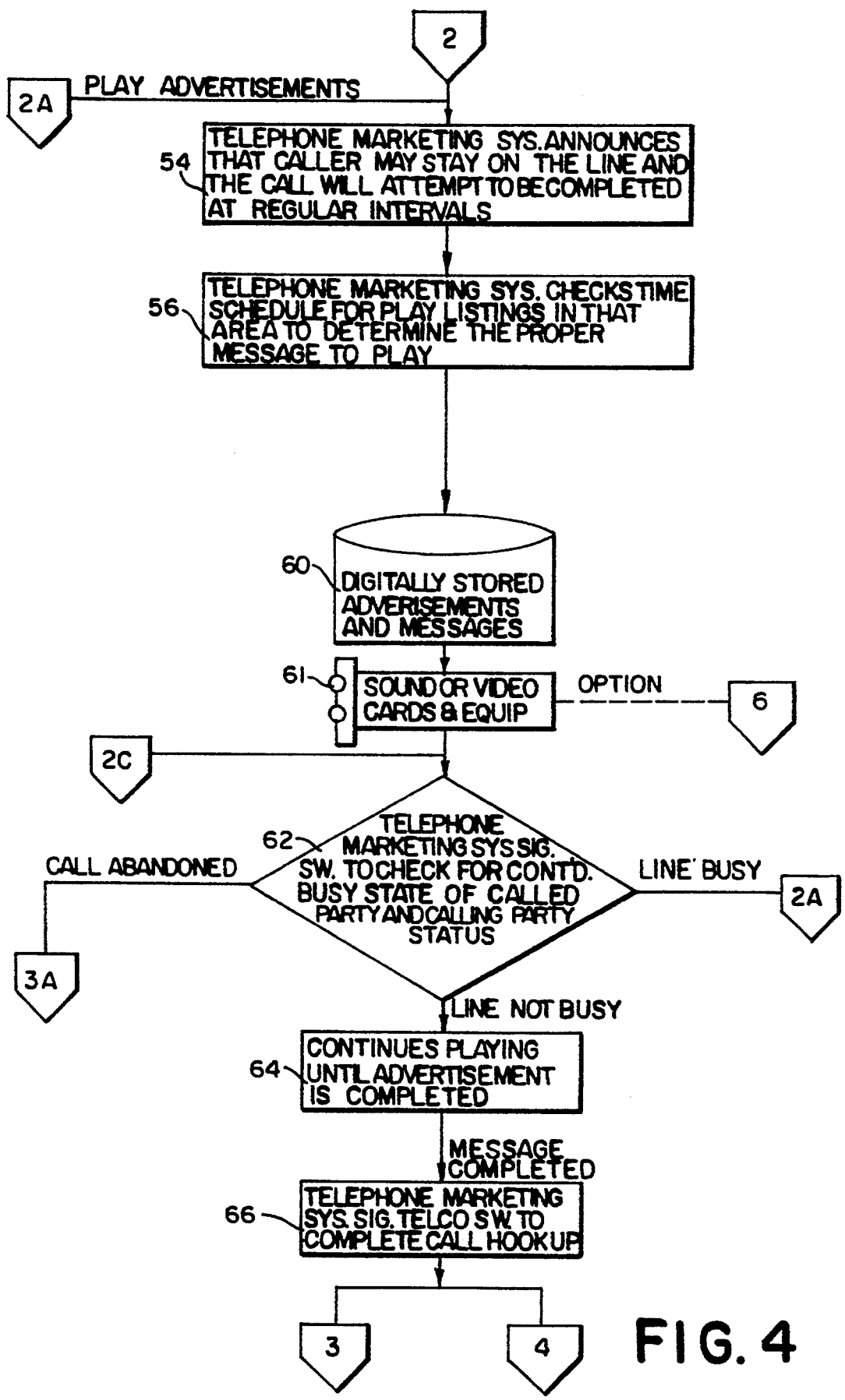
Figure 5:
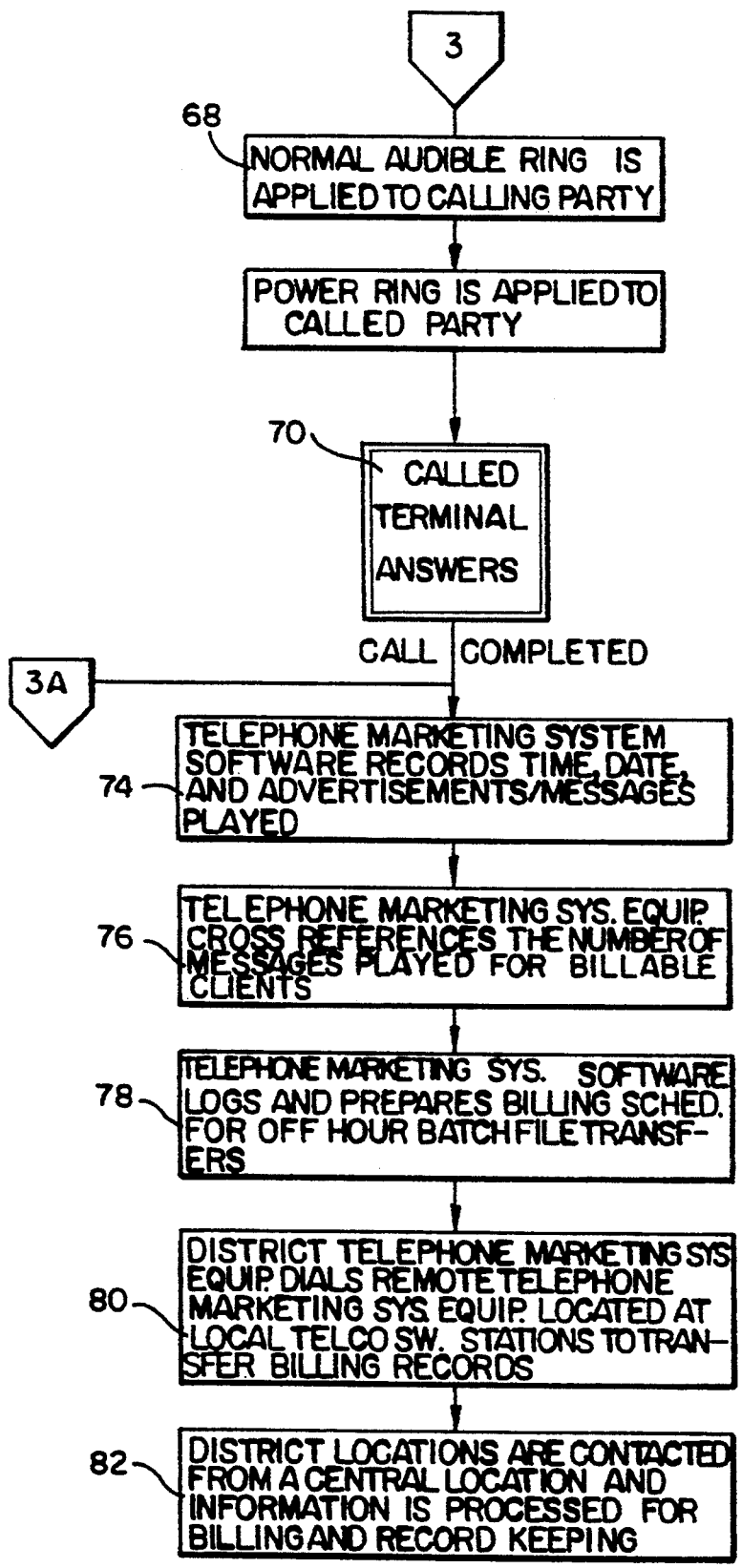
Figure 6:
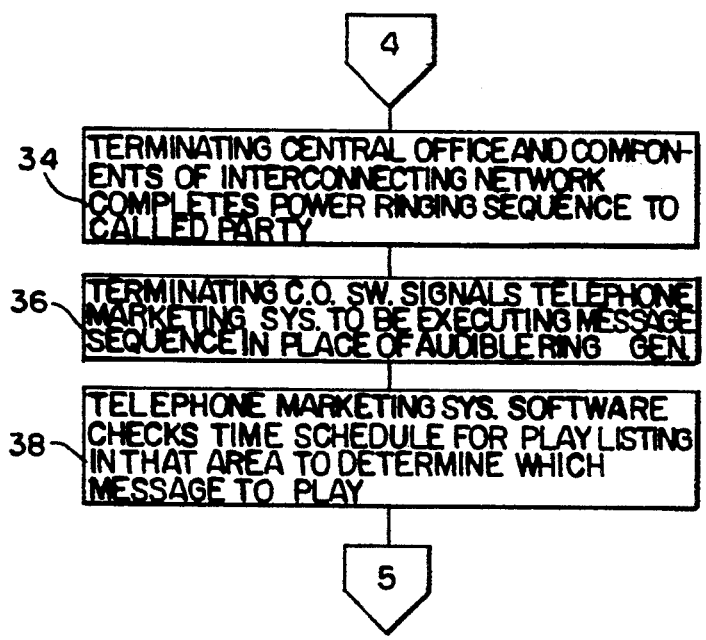
Figure 7:
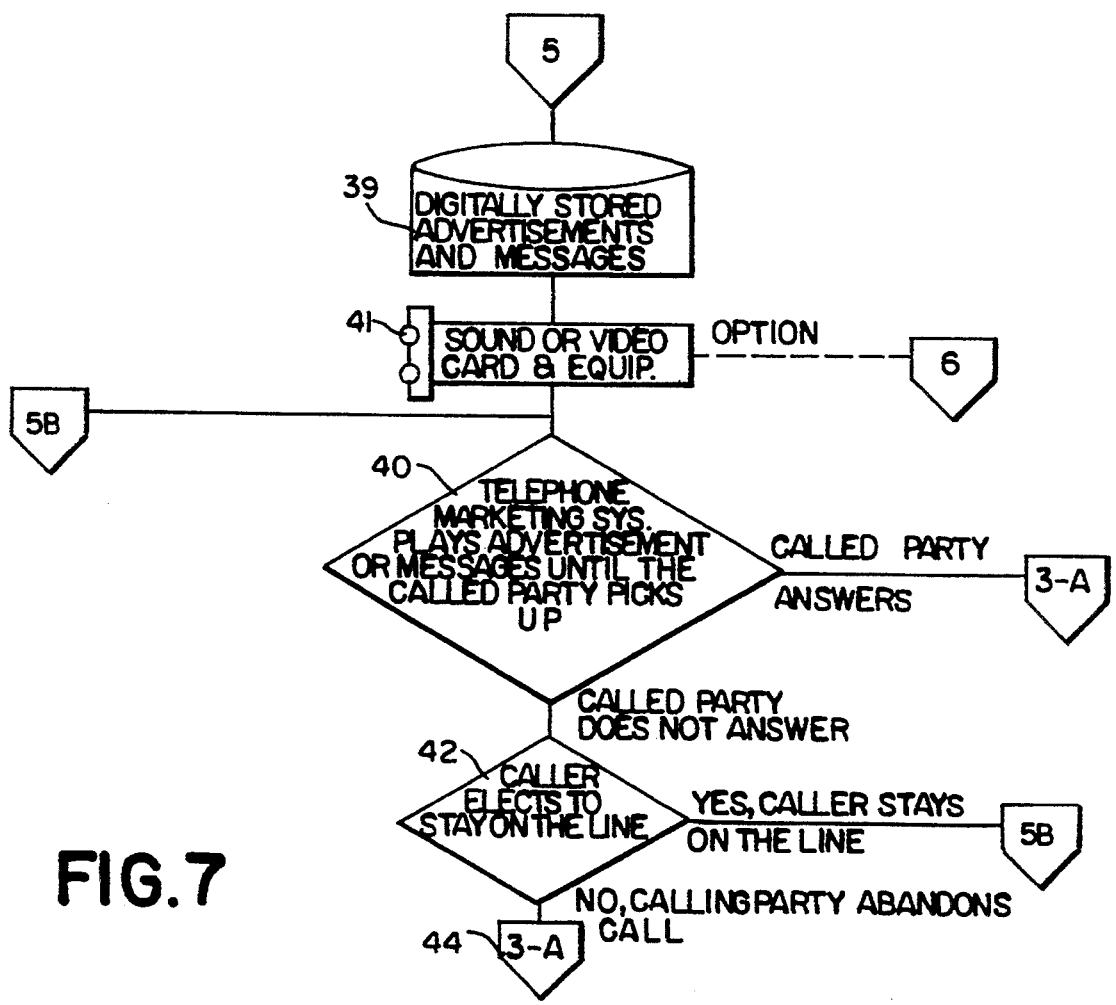

Referring specifically to FIGS. 3-8, there is shown a flow diagram depicting call handling procedures which can be performed by the preferred embodiment of the communications marketing system 10 in accordance with the present invention. Referring specifically to FIG. 3, a call is received from the first telephone station 12 located at a first location via a local or interexchange telecommunications network to a first central office 15 at block 30. The called network address or station switch 22 located at a second local central office 21 receives the incoming call and it or the ANSS 23 determines the initial status of the second telephone 20 or identified called network address or station at block 32. If the second telephone 20 is idle (on-hook), the system 10 initiates a sequence of prerecorded announcements as illustrated in FIGS. 6 and 7.

The second switch 22 located at the second local central office 21 or an ANSS 23 switches on a message generator 16 at block 36. The message generator 16 plays at least one prerecorded announcement over the line to the calling party at the first telephone 12 at block 40. In the preferred embodiment, the prerecorded announcements are played in predetermined segments of time. Each segment of time comprises a number of short messages and/or advertisements which are digitally stored within the system 10 and are designed to fill a 5-30 second time span. It is to be understood by those skilled in the art that the time frame for each segment of time is arbitrary and that the announcements can be played in any predetermined segment of time. The message generator 16 determines the type of announcements and the duration in which the announcements are to be played at block 38.

As discussed above, the announcements to be played are determined by comparing information, such as the network address of the first telephone 12 or the time of day, to a look up table located within the message generator 16 to determine which announcements are to be played. The commencement of the playing of the announcements is illustrated in FIG. 7. Once the playing format is determined in block 38, the digitally stored announcements are retrieved from the memory of the message generator 16 at block 39. The information is translated to audio and/or video signals at block 41.

Once the announcements are retrieved from memory, the message generator 16 plays a series of announcements to the calling party at the first telephone 12 at block 40. If the second telephone 20 is answered, the message generator 16 enters a completed call sequence which is illustrated in FIG. 5 beginning at 3A and which will be described hereinafter. If the second telephone 20 is not answered, the system 10 through switch 18 or an ANSS 23 determines if the first telephone 12 is still off-hook at block 42. If the first telephone 12 is still off-hook, the message generator 16 returns to 5B and repeats the steps described in blocks 40 and 42. If the call has been abandoned, i.e., the first telephone 12 is on-hook, the message generator 16 enters a completed call sequence which is illustrated in FIG. 5 beginning at 3A and which will be described hereinafter.

Referring now to FIG. 3, if the second telephone 20 is initially determined to be busy at block 32, i.e., the second telephone 20 is in use (off-hook), then the switch 22 at the second local central office 21 or an ANSS 23 determines whether there is enough network capacity available to activate the marketing system 10 to prevent a network overload at block 46. If the current network load is greater than the established maximum network load, then the switch 22 or an ANSS 23 instructs the audible signal generator 14 to generate a standard busy signal as shown at block 48. The calling party abandons the call by disconnecting the first telephone 12 (on-hook) and the call is terminated as shown at block 50. If the current network load is determined to be less than the established maximum network load at block 46, the switch 22 or the ANSS 23 suspends call processing for a predetermined period of time and activates the message generator 16 to initiate a sequence of prerecorded announcements at block 52 as further illustrated in FIG. 4.

In the preferred embodiment, the message generator 16 first instructs the calling party to remain on the telephone 12 and informs the calling party that the call to the second telephone 20 will be attempted to be completed at regular intervals at block 54. Communication messages are passed between the message generator 16 and the network's call processing software system to determine the current status of the second telephone 20. Simultaneously, the message generator 16 determines the type of announcements that should be played and the order in which they will be played at block 56. The message generator 16 then preferably generates digitally stored advertisements, messages or announcements to the calling party at the first telephone 12 for a predetermined period of time at block 60. It is to be understood by those skilled in the art that any type of advertisement and/or message can be generated by the message generator 16. The information is translated to audio and/or video signals at block 61. When the predetermined time period has expired, the switch 22 or the ANSS 23 resumes call processing to determine whether the second telephone 20 is still busy at block 62. If the second telephone 20 is still busy, call processing is again suspended for a predetermined period of time and the switch 22 or the ANSS 23 notifies the message generator to return to 2A and repeat the steps in blocks 54–62. The announcement indicating that the line is busy may be eliminated after the initial message sequence. A sequence of additional announcements are played to the calling party at the first telephone 12 and call processing to the second telephone 20 is again retried within a predetermined period of time. In the preferred embodiment, if the second telephone 20 is not busy as determined by switch 22 or the ANSS 23, the switch 22 or the ANSS 23 notifies the message generator 16 to continue to play its announcements until it reaches completion of its current announcement (block 64) and then signals to switch 22 or the ANSS 23 to complete call processing to the second telephone 20 at block 66. The message sequence may optionally be interrupted at any point subsequent to the switch 22 or ANSS 23 determining that the second telephone 20 has become idle. The message generator then proceeds to the ringing and call completion sequence as shown in FIG. 5 or the call completion sequence as shown in FIG. 6.

Referring specifically to FIG. 5, once the second telephone 20 is determined to be idle and after the message generator has completed its message sequence, the switch 22 initiates a power ring which causes telephone 20 to ring by applying the appropriate voltage and current to the line between telephone 20 and switch 22. Once the second telephone 20 is answered by the lifting of the receiver of the second telephone 20 at block 70, the calling process is completed. At the completion of the call processing, the message generator 16 enters a call completion sequence and records the time, date and the type of announcements which have been played in the memory of the microprocessor 100 at block 74. Internal software in the message generator 16 cross-references the number of announcements played to the calling party at the first telephone 12 to the person or entity which is sponsoring each of the announcements at block 76. In the preferred embodiment, the sponsoring person or entity can be an advertiser or some other type of a billable or non-billable client. Next, the message generator 16 provides a billing schedule for determining the amount which the sponsoring person or entity should be charged at block 78. In the preferred embodiment, the message generator 16 is also capable of dialing to or being dialed by remote computing equipment (not shown) in order to transfer billing records so that the appropriate sponsoring person or entity can be billed at block 80. In an alternative embodiment, regional computing equipment which receives billing records from remote message generators can connect with central computing equipment for central billing and processing at block 82.

Referring specifically to FIG. 6, there is shown an alternative call completion sequence after the encountering of an initial busy condition. Once the system 10 signals switch 22 or the ANSS 23 to resume call processing as shown in block 66, the second switch 22 initiates the power ringing sequence to the second telephone at block 34. Next the switch 22 at the second local central office 21 or the ANSS 23 signals to the message generator 16 to begin executing announcements at block 36. The message generator 16 then determines the announcement sequence to be played at block 38. The playing of the announcement sequence is shown in FIG. 7 and has been described above and will not be discussed further.

The network through which the call is being made can be an intelligent network, i.e., a network which utilizes advanced signaling techniques or a network having automated number identification (ANI) or a network having integrated services digital network (ISDN) capabilities. The previously described attached network signaling system 23 in this embodiment is part of intelligent network or ISDN capabilities. Automatic number identification or equivalent is a feature of a local exchange, inter-exchange or long distance network which passes the network address of the telephone line of the calling telephone 12 through the network where it is then available for processing. ISDN is an array of equipment, protocols, facilities and services which allow for certain advanced telecommunication capabilities. The message generator 16 can interact with the intelligent network via existing service nodes which are well-known in the art and will not be discussed further. By connecting the message generator 16 to the intelligent network, the message generator 16 is capable of utilizing many of the services available within the intelligent network as shown in FIG. 8 and will be described as follows.

Figure 8:
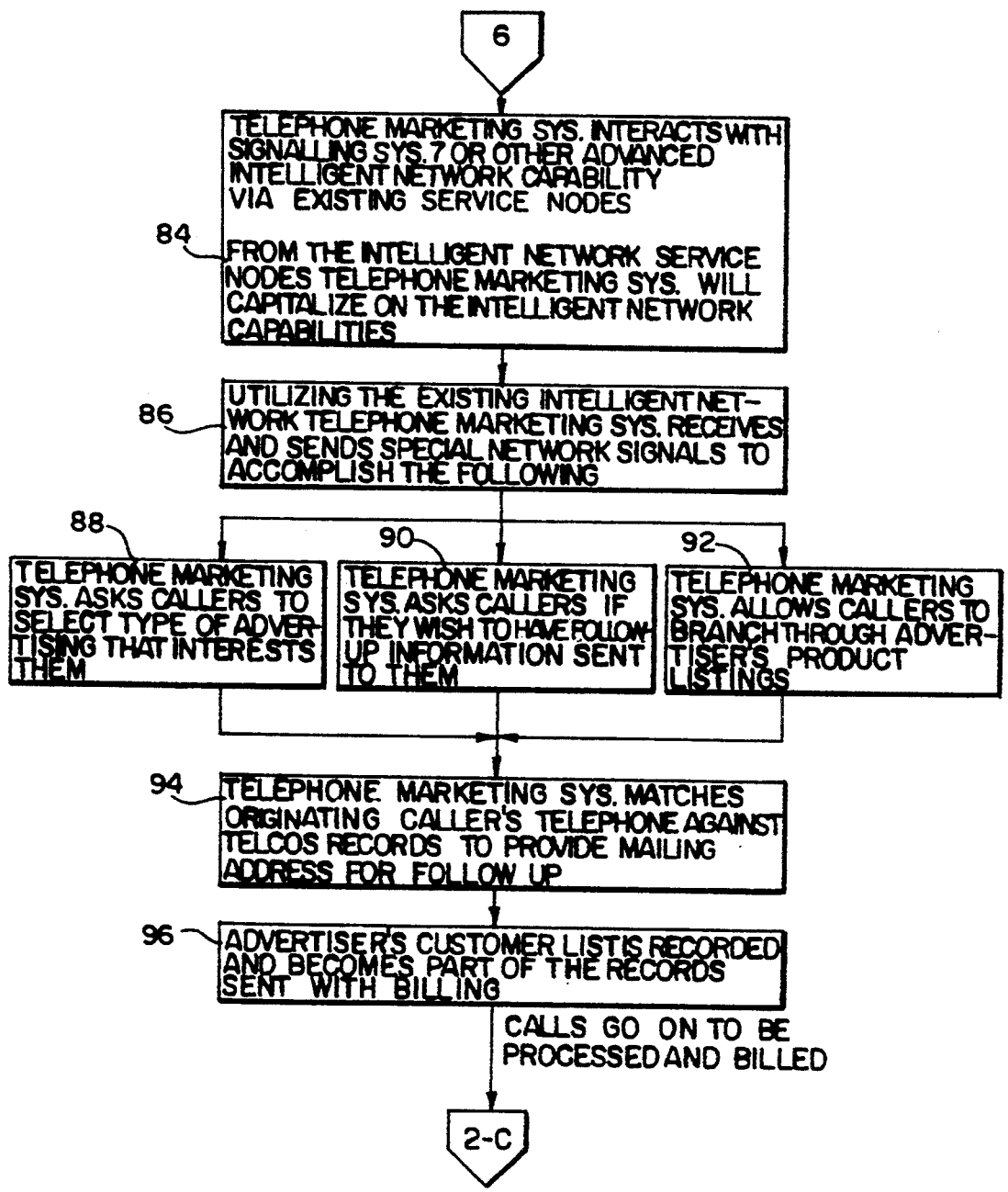

The message generator 16 receives and sends network signals using the existing intelligent network to accomplish various functions at block 86 (FIG. 8). The message generator 16 is capable of interacting with the calling party so that, for example, the calling party can obtain additional information relating to a particular announcement or select different types of advertising at block 88. At the appropriate prompt provided by the message generator 16, a calling party could respond either by voice or by pushing the appropriate buttons on a standard touch tone phone or by pressing a key on a keyboard to a computer, touch screen or any other device capable of transmitting and receiving signals. Once the message generator 16 detects the assertion of a given prompt by the calling party, the microprocessor 100 identifies the network address of the calling party using ANI or equivalent, and connects the calling party to a third party which can provide additional information. The network address of the additional party is obtained by retrieving the network address from a look up table located within the memory of the microprocessor 100. Once the network address of the third party is obtained, the message generator 16 interacts with the telephone network to enable the connection of the calling party to the third party. For example, if the announcement relates to a sale at a particular retail store, the calling party can be connected to the retail store automatically to obtain additional information. It is to be understood by those skilled in the art that additional information can be obtained for any announcement which is played provided that an appropriate prompt is initiated by the message generator 16. If a calling party decides to obtain additional information relating to a particular announcement, the calling party is permanently disconnected from the original call and must redial the original called network address or station line at a later time. Alternatively, the message generator 16 can provide upon a given prompt by the calling party a recording of the network address of the third party, who can provide additional information so that the calling party may later place a separate call to the third party. The network address of the third party is identified by referring to a look up table located within the memory of the microprocessor 100.

In an additional embodiment, the calling party can receive additional information by providing the mailing address of the calling party to the message generator 16. One method is for the calling party to respond to an offer of additional information by providing a given prompt. The message generator 16 then requests the calling party's name and address so that additional information can be provided. The calling party provides a name and address which is recorded in the memory of the message generator 16. The name and address of the calling party and the request for additional information is then transferred to the identified third party for further processing, such as a follow-up call or mailing of printed information. In an alternative embodiment, the message generator 16 is capable of identifying the network address of the calling telephone 12 when the message generator 16 receives a given prompt. Once the network address of the calling telephone is identified, the network address is compared to a reverse telephone directory located within the memory of the microprocessor 100 or the controller 17 from which the name and address of the calling telephone is retrieved. The name and address of the calling telephone is transmitted to the identified third party for further processing.

The types of advertisements or messages which can be directed to the calling party can refer to certain types of consumer goods, business machines, certain communication systems, or the products manufactured and/or sold, or services provided by a particular corporation or individual. It is to be understood by those skilled in the art, that the advertisements can be of any particular subject matter and are not restricted to those mentioned above. The message generator 16 is also capable of inquiring if the calling party wishes to be sent follow up information at block 90. If the calling party answers in the affirmative, the message generator 16 can record the name and address or fax number of the calling party and establish a customer mailing list therefrom. The calling party responds to the message generator 16 by either pushing a specified button on the face of the telephone if the calling party is using a touch tone telephone or a keyboard if the calling party is attached to a computer, or a voice activated response which would be transmitted to a device capable of recognizing and recording the calling party's response for later processing. The message generator 16 can also provide calling parties with a directory type service whereby a calling party could browse through an advertiser's product listings at block 92. Such a service would be advantageous if a sponsoring person or entity produced or manufactured a large number of products. Along with the listing, a caller could have the capability of requesting additional information, such as, but not limited to prices and quantity. As discussed above, if the calling party wishes to obtain additional information, the calling party can assert a given prompt to cause the message generator to connect the calling party to a third party.

If the address of the calling party is not identified during the announcement sequence, the message generator 16 is capable of matching the originating telephone 12 network address of the calling party with the records of the sponsoring person or entity to provide a mailing address for a follow up response at block 94. If the network has ANI or equivalent capabilities, the system can immediately identify the calling station by its identification number, i.e., its telephone number or network address. In addition, the message generator 16 can provide a recorded customer list at block 96 which can become a permanent part of the sponsoring person or entity's records and be included along in billing invoices.

It is to be noted that at the completion of any option of the system 10, the system 10 can monitor the status of the call through switch 18 or the ANSS 23, determine billing, and record relevant data about the advertisements which were played as described in blocks 74–80 of FIG. 5 which have been described previously.

From the foregoing description, it can be seen that the present invention comprises a communications marketing system for selectively modifying an existing communications network by replacing at least a portion of an audible or visual call progress signal generated by the communications network by a prerecorded announcement and by modifying a portion of the existing call processing software of the communications network. It will be appreciated by those skilled in the art that changes could be made to the embodiment described above without departing from the broad inventive concept thereof. It is understood, therefore, that this invention is not limited to the particular embodiment disclosed but it is intended to cover all modifications which are within the scope and spirit of the invention as defined by the appended claims.

We claim:

1. A marketing system for selectively modifying an existing communications network by modifying a portion of the processing software of the existing communications network and by replacing at least a portion of a call progress signal generated by the communications network by a generally continuous prerecorded announcement, the system comprising:

means for placing a call by a calling party at a first network address;

means for connecting the call to an identified called station at a second network address, the called station having either a busy status or an idle status;

means for initially determining the busy/idle status of the called station and, if the called station has an initial busy status, for thereafter checking the busy/idle status of the called station at predetermined intervals;

means for playing at least one generally continuous announcement to the calling party for a predetermined period of time during a time period when a call progress signal would have been provided to the calling party, said playing means determining the announcement to play based upon criteria established exclusively by the marketing system and independently of the identity of the called station; and means for terminating the playing of the announcement and completing the call to the called station, in the case of the called station having an initial idle status, said announcement terminating and call completing means completing the call when the called station responds by answering the call and, in the case of the called station having an initial busy status, said announcement terminating and call completing means completing the call when the status of the called station changes to an idle status and the called station thereafter responds by answering the call.

2. The system as recited in claim 1 wherein the playing means can play a sequence of announcements and wherein the system repeatedly generates additional announcements at predetermined intervals until the called station responds by answering the call or the calling party abandons the call.

3. The system as recited in claim 1 further comprising interaction means for permitting the calling party to interact with the announcement during the playing of the announcement by initiating a predetermined response.

4. The system as recited in claim 1 further comprising selecting means for allowing the calling party to select a type of announcement to be played.

5. The system according to claim 1 wherein the network includes at the calling party location a video terminal connected to the network and capable of receiving video messages transmitted through the network.

6. The system as recited in claim 1 wherein the announcement is digitally stored within the playing means.

7. The system as recited in claim 1 further including means for changing, updating or deleting the announcement.

8. A method for use with an existing communications network for replacing at least a portion of a call progress signal generated by the communications network when a call is placed by a calling party at a first network address and prior to the connection of the call to an identified called station at a second network address, the called station having either a busy status or an idle status, the method comprising:

initially determining the busy/idle status of the called station and, if the called station has an initial busy status, thereafter checking the busy/idle status of the called station at predetermined intervals;

playing at least one generally continuous announcement to the calling party for a predetermined period of time during a time period when a call progress signal would have been provided to the calling party, the announcement being determined based upon criteria established exclusively by the marketing system and independently of the identity of the called station; and terminating the playing of the announcement and completing the call to the called station, in the case of the called station having an initial idle status, when the called station responds by answering the call and, in the case of the called station having an initial busy status, when the status of the called station changes to an idle status and the called station thereafter responds by answering the call.

9. The method as recited in claim 8 further comprising the step of playing a sequence of announcements at predetermined intervals until the called station answers the call or the calling party abandons the call.

10. The method as recited in claim 8 further comprising the step of permitting the calling party to interact with the announcement during the playing of the announcement by initiating a predetermined response.

11. The method as recited in claim 8 further comprising the step of allowing the calling party to select a type of announcement to be played.

* * * * *

(12) EX PARTE REEXAMINATION CERTIFICATE (7574th)
United States Patent
Gregorek et al.

(10) Number: US 5,428,670 C1
(45) Certificate Issued: Jun. 29, 2010

(54) COMMUNICATIONS MARKETING SYSTEM

(75) Inventors: Mark R. Gregorek, Mahwah, NJ (US); Jeffrey C. Dillow, Sparta, NJ (US)

(73) Assignee: Greenville Communications, LLC, Greenville, MS (US)

Reexamination Request:
No. 90/010,204, Jun. 23, 2008

Reexamination Certificate for:
Patent No.: 5,428,670
Issued: Jun. 27, 1995
Appl. No.: 08/245,723
Filed: May 18, 1994

Related U.S. Application Data

(63) Continuation-in-part of application No. 07/718,080, filed on Jun. 20, 1991, now Pat. No. 5,321,740.

(51) Int. Cl.
*H04Q 3/00* (2006.01)
*H04M 3/487* (2006.01)
*H04M 3/48* (2006.01)
*H04M 19/02* (2006.01)
*H04M 19/00* (2006.01)
*G05G 9/00* (2006.01)
*G05G 9/047* (2006.01)

(52) U.S. Cl. .................. 379/67.1; 379/257; 379/381; 379/88.25

(58) Field of Classification Search .................. None
See application file for complete search history.

(56) References Cited

U.S. PATENT DOCUMENTS

| 4,468,528 A | 8/1984 | Reece |
| 4,577,067 A | 3/1986 | Levy |
| 4,809,321 A | 2/1989 | Morganstein |
| 5,007,077 A | 4/1991 | Fields |
| 5,150,399 A | 9/1992 | Yasuda |

FOREIGN PATENT DOCUMENTS

| JP | 45-13847 | 5/1970 |
| JP | 58-173951 | 10/1983 |
| JP | 62-136952 | 6/1987 |
| WO | 93/00763 | 1/1993 |

*Primary Examiner*—James Menefee

(57) ABSTRACT

A marketing system for selectively modifying an existing communications network by modifying a portion of the processing software permits replacing at least a portion of a call progress signal generated by the communications network by a generally continuous prerecorded announcement. A first station is provided for placing a call by a calling party at a first network address. The network is adapted for connecting the call to an identified called station at a second network address, the called station having either a busy status or an idle status. The network initially determines the busy/idle status of the called station and, if the called station has an initial busy status, thereafter checks the busy/idle status of the called station at predetermined intervals. A player plays at least one generally continuous announcement to the calling party for a predetermined period of time during a time period when a call progress signal would have been provided to the calling party. The player determines the announcement to be played based upon criteria established exclusively by the marketing system and independently of the identity of the called station. The playing of the announcement is terminated and the call is completed to the calling station, in the case of the calling station having an initial idle status, when the called station responds by answering the call. In the case of the called station having an initial busy status, the playing of the announcement is terminated and the call is completed when the status of the called station changes to an idle status and the called station thereafter responds by answering the call.

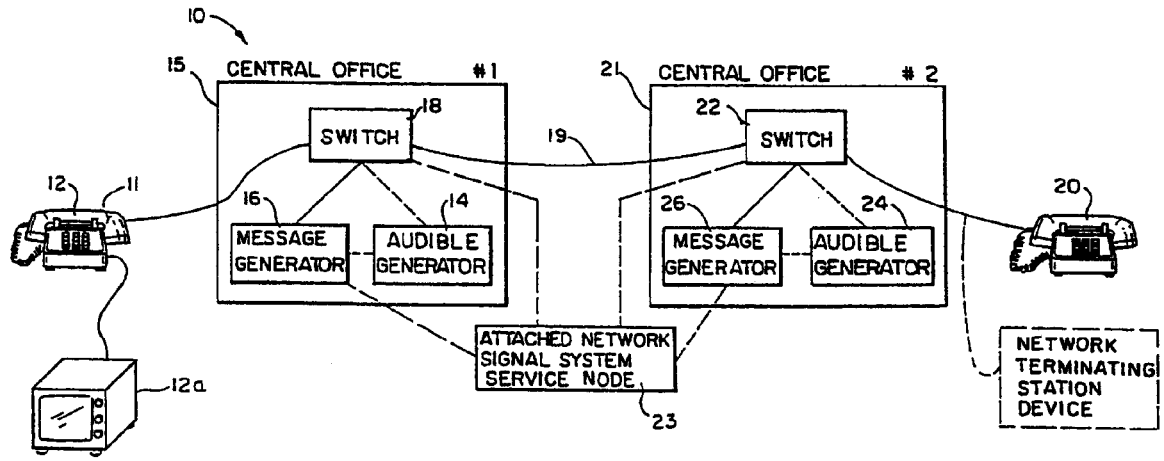

US 5,428,670 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–11 is confirmed.

New claims 12–55 are added and determined to be patentable.

12. *The system of claim 1, wherein the communications network is connected to a video display terminal configured to transmit video signals.*

13. *The system of claim 1, wherein the means for determining the busy/idle status of the called station comprises an attached network signaling system (ANSS) which is configured to instruct a signal generator or notify a switch of a central office to instruct the signal generator to transmit the call progress signal.*

14. *The system of claim 1, wherein the criteria comprises a time of day, a day of week, a month of year, an area code and a telephone exchange of the calling party.*

15. *The system of claim 1, wherein the announcement is a live announcement.*

16. *The system of claim 1, wherein the system is configured to play the announcement to fill a 5 to 30 second time span.*

17. *The system of claim 1, wherein the system is configured to play the announcement until completed.*

18. *The system of claim 3, wherein the interaction means is configured to provide a voice interaction.*

19. *The system of claim 13, wherein the means for playing at least one generally continuous announcement comprises a message generator which is connected to the switch.*

20. *The system of claim 13, wherein the ANSS is configured to monitor a current network load to determine whether there is enough network capacity available to activate the marketing system.*

21. *The system of claim 19, wherein the message generator comprises the signal generator.*

22. *The system of claim 19, wherein the message generator is located at the ANSS.*

23. *The system of claim 19, wherein the message generator comprises a video card configured to transmit a video announcement.*

24. *The system of claim 19, wherein the message generator comprises a clock configured to monitor the period of time necessary for the announcement to be played.*

25. *The system of claim 19, wherein the message generator comprises a controller which records the announcement's file name, play time, geographical area in which the announcement has been played, and billing charge.*

26. *The system of claim 19, wherein the message generator is configured to record a time, a date and a type of announcement.*

27. *The system of claim 19, wherein the message generator is configured to dial to or be dialed by a remote computing equipment to transfer billing records.*

28. *The system of claim 19, wherein the message generator is connected with a regional computing equipment configured to receive billing records from the message generator, the regional computing equipment being connected with a central billing computing equipment.*

29. *The system of claim 19, wherein the message generator is configured to connect the calling party to a third party which provides additional information regarding the announcement.*

30. *The system of claim 19, wherein the calling party receives additional information regarding the announcement by providing a mailing address of the calling party to the message generator.*

31. *The system of claim 19, wherein the message generator is configured to inquire regarding whether the calling party wishes to be sent follow up information.*

32. *The system of claim 19, wherein the message generator is configured to provide the calling party with a directory type service whereby the calling party browses through an advertiser's product listings.*

33. *The system of claim 19, wherein the message generator is configured to provide a recorded customer list which becomes a part of a sponsoring party's record and is included along in billing invoices.*

34. *The system of claim 20, wherein the ANSS is configured to instruct the signal generator to generate a standard busy signal if the current network load is greater than an established maximum network load.*

35. *A marketing system for selectively modifying an existing communications network by modifying a portion of the processing software of the existing communications network and by replacing at least a portion of a call progress signal generated by the communications network by a generally continuous prerecorded announcement, the system comprising:*

*means for placing a call by a calling party at a first network address;*

*means for connecting the call to an identified called station at a second network address, the called station having either a busy status or an idle status;*

*means for initially determining the busy/idle status of the called station and, if the called station has an initial busy status, for thereafter checking the busy/idle status of the called station at predetermined intervals;*

*means for playing at least one generally continuous announcement to the calling party for a predetermined period of time during a time period when a call progress signal would have been provided to the calling party, said playing means determining the announcement to play based upon criteria established exclusively by the marketing system and independently of the identity of the called station;*

*means for terminating the playing of the announcement and completing the call to the called station, in the case of the called station having an initial idle status, said announcement terminating and call completing means completing the call when the called station responds by answering the call and, in the case of the called station having an initial busy status, said announcement terminating and call completing means completing the call when the status of the called station changes to an idle status and the called station thereafter responds by answering the call;*

*interaction means for permitting the calling party to interact with the announcement during the playing of the announcement by initiating a predetermined response;* selecting means for allowing the calling party to select a type of announcement to be played; and means for changing, updating or deleting the announcement, wherein the playing means can play a sequence of announcements and wherein the system repeatedly generates additional announcements at predetermined intervals until the called station responds by answering the call or the calling party abandons the call, wherein the network includes at the calling party location a video terminal connected to the network and configured to receive and transmit video messages through the network, wherein the announcement is digitally stored within the playing means, wherein the means for determining the busy/idle status of the called station comprises an attached network signaling system (ANSS) which is configured to instruct a signal generator or notify a switch of a central office to instruct the signal generator to transmit the call progress signal, wherein the criteria comprises a time of day, a day of week, a month of year, an area code and a telephone exchange of the calling party, wherein the announcement is a live announcement, wherein the system is configured to play the announcement to fill a 5 to 30 second time span, wherein the system is configured to play the announcement until completed, wherein the interaction means is configured to provide a voice interaction, wherein the means for playing at least one generally continuous announcement comprises a message generator which is connected to the switch, wherein the ANSS is configured to monitor a current network load to determine whether there is enough network capacity available to activate the marketing system, wherein the message generator comprises the signal generator, wherein the message generator is located at the ANSS, wherein the message generator comprises a video card configured to transmit a video announcement, wherein the message generator comprises a clock configured to monitor the period of time necessary for the announcement to be played, wherein the message generator comprises a controller which records the announcement's file name, play time, geographical area in which the announcement has been played, and billing charge, wherein the message generator is configured to record a time, a date and a type of announcement, wherein the message generator is configured to dial to or be dialed by a remote computing equipment to transfer billing records, wherein the message generator is connected with a regional computing equipment configured to receive billing records from the message generator, the regional computing equipment being connected with a central computing equipment, wherein the message generator is configured to connect the calling party to a third party which provides additional information regarding the announcement, wherein the calling party receives additional information regarding the announcement by providing a mailing address of the calling party to the message generator, wherein the message generator is configured to inquire regarding whether the calling party wishes to be sent follow up information, wherein the message generator is configured to provide the calling party with a directory type service whereby the calling party browses through an advertiser's product listings, wherein the message generator is configured to provide a recorded customer list which becomes a part of a sponsoring party's records and is included along in billing invoices, and wherein the ANSS is configured to instruct the signal generator to generate a standard busy signal if the current network load is greater than an established maximum network load.

36. The method of claim 8 further comprising transmitting a video announcement.

37. The method of claim 8 further comprising storing a digital announcement.

38. The method of claim 8 further comprising at least one of changing, updating and deleting the announcement.

39. The method of claim 8 further comprising providing a voice interaction with the calling party.

40. The method of claim 8 further comprising monitoring a current network load to determine whether there is enough network capacity available to activate the marketing system.

41. The method of claim 8 further comprising playing a live announcement.

42. The method of claim 8 further comprising playing the announcement to fill a 5 to 30 second time span.

43. The method of claim 8 further comprising playing the announcement until completed.

44. The method of claim 8 further comprising monitoring a period of time necessary for the announcement to be played.

45. The method of claim 8 further comprising recording the announcement's file name, play time, geographical area in which the announcement has been played, and billing charge.

46. The method of claim 8 further comprising recording a time, a date and a type of the announcement.

47. The method of claim 8 further comprising dialing to or being dialed by a remote computing equipment to transfer billing records.

48. The method of claim 8 further comprising connecting the calling party to a third party which provides additional information regarding the announcement.

49. The method of claim 8 further comprising allowing the calling party to receive additional information regarding the announcement by providing a mailing address of the calling party.

50. The method of claim 8 further comprising inquiring regarding whether the calling party wishes to be sent follow up information.

51. The method of claim 8 further comprising providing the calling party with a directory type service whereby the calling party browses through an advertiser's product listings.

52. The method of claim 8 further comprising providing a recorded customer list which becomes a part of a sponsoring party's records and is included along in billing invoices.

53. The method of claim 8 further comprising instructing a signal generator to generate a standard busy signal if a current network load is greater than an established maximum network load.

54. The method of claim 8, wherein the criteria comprises a time of day, a day of week, a month of year, an area code and a telephone exchange of the calling party.

55. A method for use with an existing communications network for replacing at least a portion of a call progress signal generated by the communications network when a call is placed by a calling party at a first network address and prior to the connection of the call to an identified called station at a second network address, the called station having either a busy status or an idle status, the method comprising:

initially determining the busy/idle status of the called station and, if the called station has an initial busy status, thereafter checking the busy/idle status of the called station at predetermined intervals;
  playing at least one generally continuous announcement to the calling party for a predetermined period of time during a time period when a call progress signal would have been provided to the calling party, the announcement being determined based upon criteria established exclusively by the marketing system and independently of the identity of the called station;
  terminating the playing of the announcement and completing the call to the called station, in the case of the called station having an initial idle status, when the called station responds by answering the call and, in the case of the called station having an initial busy status, when the status of the called station changes to an idle status and the called station thereafter responds by answering the call;
  playing a sequence of announcements at predetermined intervals until the called station answers the call or the calling party abandons the call;
  permitting the calling party to interact with the announcement during the playing of the announcement by initiating a predetermined response;
  allowing the calling party to select a type of announcement to be played;
  transmitting a video announcement;
  storing a digital announcement;
  at least one of changing, updating and deleting the announcement;
  providing a voice interaction with the calling party;
  monitoring a current network load to determine whether there is enough network capacity available to activate the marketing system;
  playing a live announcement;
  playing the announcement to fill a 5 to 30 second time span;
  playing the announcement until completed;
  monitoring a period of time necessary for the announcement to be played;
  recording the announcement's file name, play time, geographical area in which the announcement has been played, and billing charge;
  recording a time, a date and a type of the announcement;
  dialing to or being dialed by a remote computing equipment to transfer billing records;
  connecting the calling party to a third party which provides additional information regarding the announcement;
  allowing the calling party to receive additional information regarding the announcement by providing a mailing address of the calling party;
  inquiring regarding whether the calling party wishes to be sent follow up information,
  providing the calling party with a directory type service whereby the calling party browses through an advertiser's product listings;
  providing a recorded customer list which becomes a part of a sponsoring party's records and is included along in billing invoices; and
  instructing a signal generator to generate a standard busy signal if a current network load is greater than an established maximum network load,
  wherein the criteria comprises a time of day, a day of week, a month of year, an area code and a telephone exchange of the calling party.

\* \* \* \* \*